(No Model.)
J. E. PACKARD.
VEHICLE BRAKE.
No. 341,936. Patented May 18, 1886.
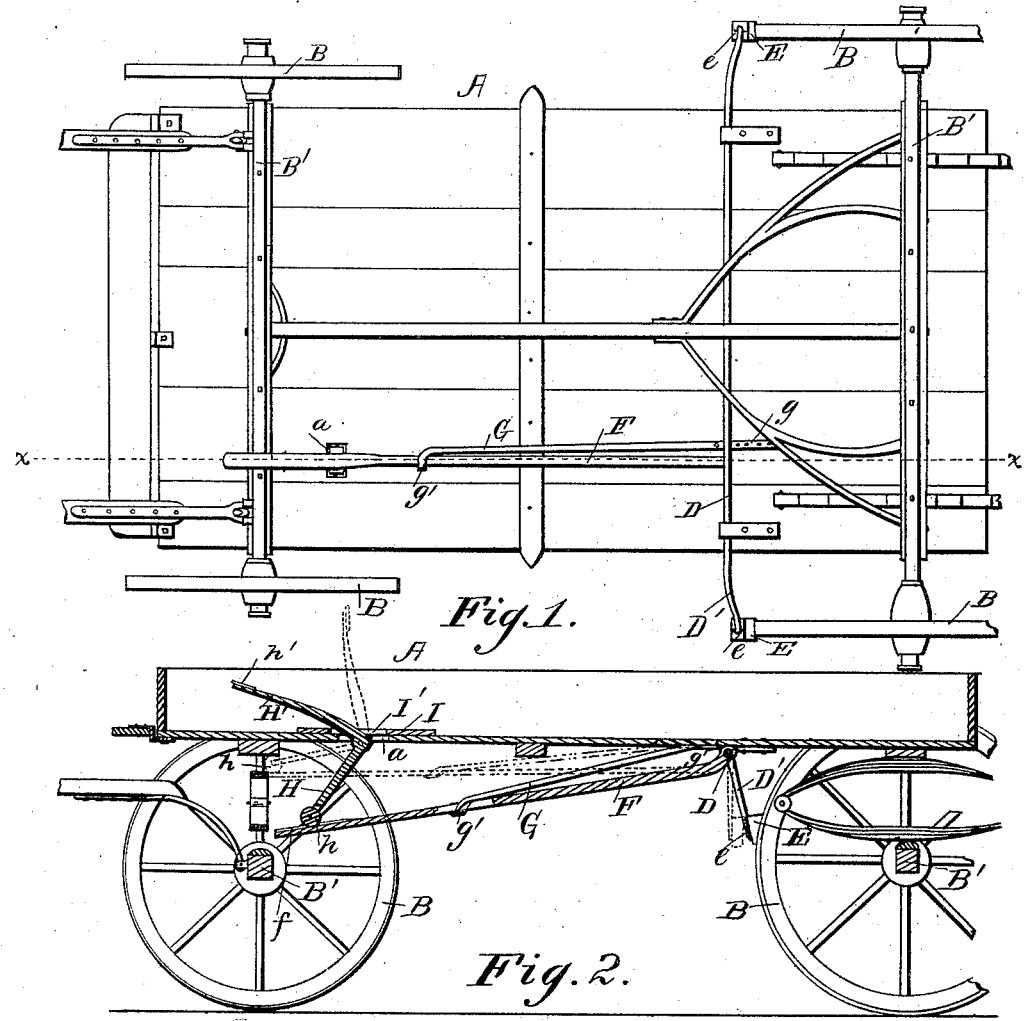
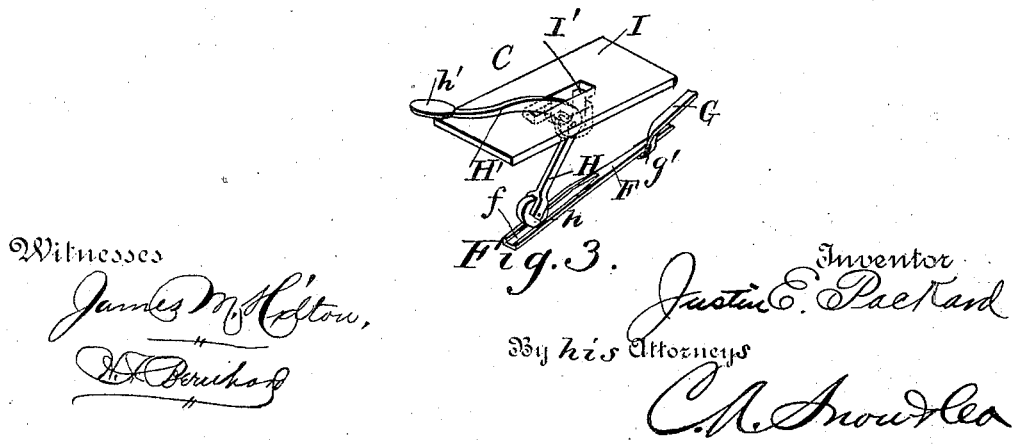
Witnesses
James M. Colton,
D. A. Bernhard
Inventor
Justin E. Packard
By his Attorneys
C. A. Snow & Co.

United States Patent Office.

JUSTIN EMERSON PACKARD, OF MENDOCINO, CALIFORNIA.

VEHICLE-BRAKE.

SPECIFICATION forming part of Letters Patent No. 341,936, dated May 18, 1886.

Application filed March 23, 1886. Serial No. 196,290. (No model.)

*To all whom it may concern:*

Be it known that I, JUSTIN EMERSON PACKARD, a citizen of the United States, residing at Mendocino, in the county of Mendocino and State of California, have invented a new and useful Improvement in Vehicle-Brakes, of which the following is a specification, reference being had to the accompanying drawings.

My invention relates to improvements in vehicle-brakes; and it consists of the peculiar and novel construction and combination of parts, substantially as hereinafter fully set forth, and specially pointed out in the claims.

The primary object of my invention is to provide an improved brake for buggies, wagons, and other like vehicles, which shall exert a maximum degree of force on the wheels of a vehicle with a small expenditure of force on the part of the driver.

A further object of the invention is to provide means which shall be always ready for instantaneous operation, and which shall be free from the objectionable rattling noise so common in many brakes when the vehicle travels over rough or uneven roads.

The invention is very simple, strong, and durable in its construction, easily and readily applied and adjusted upon any class of vehicle, is thoroughly effective for the purpose designed, and cheap and inexpensive of manufacture.

In the accompanying drawings, Figure 1 is bottom plan view of a vehicle having my improved brake applied thereto, and Fig. 2 is a vertical longitudinal sectional view on the line *x x* of Fig. 1. Fig. 3 is a detail perspective view of the foot-lever.

Referring to the drawings, in which like letters of reference denote corresponding parts in all the figures, A designates the body of the vehicle which is supported on the carrying wheels B, that are journaled on an axle, B', suitably secured to the body, all of which are the usual or any preferred form or class of vehicle, my improved braking apparatus C being applicable to all classes of two or four wheeled vehicles.

D designates the brake-bar, which is arranged transversely of the vehicle-body on the under face thereof and immediately in front of a pair of the wheels B. This brake-bar, or as it may be called, an "oscillating" or "rock" shaft, is journaled in suitable boxes or bearings, *d*, that are bolted to the body, and the ends of the oscillating brake-bar are bent downwardly and outwardly to provide the compound curved arms D', that are arranged outside of and below the plane of the body of the vehicle, and occupy such relative positions to the carrying-wheels thereof that when the shoes carried thereby are applied thereto they exert their maximum force on the wheels. The free ends of the curved arms D' of the oscillating brake-bar are provided with carrying-plates *e*, to which are securely bolted the brake-shoes E, of the usual well-known form and material; and the said brake-bar D has rigidly secured thereto, or formed therewith, a lever or arm, F, which extends forward and longitudinally of the vertical body. The free end of this arm or lever is normally pressed upward by means of a flat or leaf spring or spring-bar, G, so that it is kept constantly in engagement with an anti-friction roller, *h*, carried by a foot-lever or treadle, H, that is pivoted in a bearing-plate, I, which is bolted to the vehicle-body within the space inclosed by the walls thereof.

One end of the spring or spring-bar is rigidly attached or bolted to the vehicle-body, as at *g*, while the opposite free end thereof is provided with a bent or curved spring-lip, *g'*, that fits around and is detachably connected to the arm or lever F, at or near the free end thereof. The lever F is grooved at its front free end or provided on its side edges with ribs or flanges *f*, that prevent displacement and play of the anti-friction roller *h*; or, if desired, the roller *h* may be provided with a grooved periphery that rides upon a seat of corresponding form that is made on the free end of the arm or lever F.

The bearing-plate I is bolted or otherwise suitably secured to the upper face of the vehicle-body bottom, and it is provided with a longitudinal slot, *i*, and two depending lugs, I', on its under face, which legs are perforated transversely and project through a slot, *a*, formed in the bottom of the vehicle-body.

The foot-lever H is made in the shape of a bell-crank lever, and has two arms, H' and H, at the juncture of which the lever is pivoted in the perforated lugs of the bearing-plate.

The upper arm of the lever H passes through the slots a I', and has a foot-piece, h', which is arranged within convenient reach of the driver's foot, and the lower arm, H, of the bell-crank lever is bifurcated and supports the anti-friction roller, which is loosely journaled therein. The spring normally holds the arm or lever F elevated, so that all rattling of the parts is obviated, and by reason of the arm or lever acting on the bell-crank lever, the upper arm, H', of the latter is always held in position for immediate service. When pressure is applied by means of the foot to the lever H, the roller h, carried thereby rides on the arm or lever, to depress the same and oscillate the brake-bar to apply the shoes to the wheels, whereby the motion of the vehicle will be retarded, and immediately upon release of the foot-pressure the spring will elevate the arm or lever F and draw the shoes from engagement with the wheels.

From the foregoing description it will be observed that I provide a brake which is very powerful in action, thoroughly effective in operation, extremely cheap and simple, and which can be readily and quickly applied and adjusted.

I am aware that various slight changes in the form and proportions of parts can be made without departing from the spirit of my invention.

Having thus described my invention, what I claim as new, and desire to secure by Letters Patent, is—

1. The combination of a rock-shaft carrying the shoes, an oscillating foot-lever carrying a roller, an arm carried by the rock-shaft, and a spring connected with the arm for normally elevating the free end of the arm in contact with the friction-roller, substantially as described, for the purpose set forth.

2. The combination of a rock-shaft having the crank-arms carrying the shoes, a pivoted bell-crank lever having one end provided with a loose friction-roller, an arm carried by the rock-shaft, and a spring secured at one end to the vehicle-body, and detachably connected at its other end to the arm, for normally elevating the free end of the latter in contact with the friction-roller, substantially as described, for the purpose set forth.

3. In a vehicle-brake, the combination of a body, the carrying-wheels, the bearings or boxes d, an oscillating brake-bar journaled in the bearing and having the curved arms D', having the plates e, the shoes secured to said plates, an arm or lever, F, carried by the brake-bar and having the flanges f at its free end, a spring or spring-bar, G, bolted to the body and having a lip, g', connected to the arm or lever F, a slotted plate, I, having the lugs, and a bell-crank foot-lever, H, pivoted centrally to the lugs, and carrying a friction-roller, h, that bears on the arm or lever F, between the flanges thereon, all arranged and combined substantially as described, for the purpose set forth.

In testimony that I claim the foregoing as my own I have hereto affixed my signature in presence of two witnesses.

JUSTIN EMERSON PACKARD.

Witnesses:
ELISHA W. BLAIR,
CHARLES O. PACKARD.